(12) United States Patent
Masuko (10) Patent No.: US 8,562,195 B2
(45) Date of Patent: Oct. 22, 2013

(54) FIBER OPTIC ILLUMINATION MODULE WITH FIBER OPTIC COUPLING

(75) Inventor: Koichiro Masuko, Sakura (JP)

(73) Assignee: Fujikura Ltd., Tokyo (JP)

( * ) Notice: Subject to any disclaimer, the term of this patent is extended or adjusted under 35 U.S.C. 154(b) by 104 days.

(21) Appl. No.: 13/053,567

(22) Filed: Mar. 22, 2011

(65) Prior Publication Data

US 2011/0242835 A1    Oct. 6, 2011

(30) Foreign Application Priority Data

Mar. 30, 2010  (JP) ................................. 2010-078966

(51) Int. Cl.
*F21V 17/10*    (2006.01)
*G02B 6/36*    (2006.01)

(52) U.S. Cl.
USPC ........... 362/581; 362/555; 362/574; 362/577; 362/511; 362/311.01; 40/547

(58) Field of Classification Search
USPC ................. 362/612, 555, 574, 577, 581, 511, 362/311.01; 40/547
See application file for complete search history.

(56) References Cited

U.S. PATENT DOCUMENTS

| | | | | |
|---|---|---|---|---|
| 1,642,187 A * | 9/1927 | Young, Jr. | ...................... | 600/248 |
| 3,131,690 A * | 5/1964 | Innis et al. | ...................... | 600/249 |
| 3,564,231 A * | 2/1971 | Bruce et al. | ...................... | 362/558 |
| 3,582,638 A * | 6/1971 | Peters | ............................. | 362/577 |
| 3,624,385 A * | 11/1971 | Wall | ............................... | 362/565 |
| 3,727,043 A * | 4/1973 | Wall | ............................... | 362/565 |
| 4,918,579 A * | 4/1990 | Bennett | .......................... | 362/559 |
| 5,086,378 A * | 2/1992 | Prince | ............................ | 362/103 |
| 5,613,031 A | 3/1997 | Tanabe et al. | | |
| 6,302,570 B1 * | 10/2001 | Petell et al. | ..................... | 362/554 |
| 6,478,477 B1 | 11/2002 | Yamaguchi | | |
| 7,309,175 B1 | 12/2007 | Rosiewicz et al. | | |
| 8,282,256 B1 * | 10/2012 | Pike et al. | ...................... | 362/555 |
| 2004/0246744 A1 * | 12/2004 | Krupa et al. | ..................... | 362/574 |
| 2008/0013905 A1 | 1/2008 | Bookbinder et al. | | |
| 2011/0176326 A1 * | 7/2011 | Stephan | ........................ | 362/555 |

FOREIGN PATENT DOCUMENTS

| | | |
|---|---|---|
| CN | 1125325 A | 6/1996 |
| CN | 101246236 A | 8/2008 |
| CN | 101657943 A | 2/2010 |
| DE | 4314031 A1 | 11/1994 |

(Continued)

OTHER PUBLICATIONS

European Search Report issued in European Application No. 11158953 dated May 8, 2012.

(Continued)

*Primary Examiner* — Ismael Negron
(74) *Attorney, Agent, or Firm* — Sughrue Mion, PLLC (57) ABSTRACT

A light-emitting module including a light-emitting device, a multi-mode optical fiber, and a housing accommodating the light-emitting device is disclosed. The optical fiber includes a core and first cladding, and has a covered fiber section including a second cladding and a bare fiber section which has a lens for receiving laser light emitted by a light-emitting end surface of the light-emitting device and is not covered with the second cladding. The housing includes an optical fiber penetration pipe for fixing a portion of the bare fiber section so that the light-emitting end surface and the lens face each other. In the optical fiber penetration pipe, the portion of the bare fiber section is fixed by a resin having a refractive index lower than that of the first cladding.

4 Claims, 4 Drawing Sheets

(56) References Cited

FOREIGN PATENT DOCUMENTS

| | | |
|---|---|---|
| EP | 0392741 A2 | 10/1990 |
| JP | 63-231307 A | 9/1988 |
| JP | 01-316705 A | 12/1989 |
| JP | 08-015572 A | 1/1996 |
| JP | 2001-051166 A | 2/2001 |
| JP | 2002-14260 A | 1/2002 |
| JP | 2004-354771 A | 12/2004 |
| JP | 2007-258480 A | 10/2007 |

OTHER PUBLICATIONS

Japanese Office Action dated Jun. 18, 2013, issued in Japanese Patent Application No. 2010-078966. Yes.

Chinese Office Action dated Apr. 15, 2013, issued in Chinese Patent Application No. 201110076285.3. Partial Translation.

* cited by examiner

| Calculated Value Data | Data A | Data B |
|---|---|---|
| Refractive Index Of Core | 1.465 | 1.465 |
| Refractive Index Of First Cladding | 1.450 | 1.450 |
| Maximum Angle Between Core And First Cladding | 8.21 | 8.21 |
| NA Of Outside Of Fiber End Surface | 0.211 | 0.211 |
| Refractive Index Of Second Cladding | 1.400 | 1.380 |
| Substantial Maximum Angle Between Core And Second Cladding Observed In Core | 17.13 | 19.61 |

FIG. 5(b)

| | Resin 1 | Resin 2 | Resin 3 | Resin 4 |
|---|---|---|---|---|
| Refractive Index <After Curing> | 1.38 | 1.403 | 1.403 | 1.43 |
| Specific Gravity (g/cm$^3$) At 25°C <After Curing> | 1.65 | 1.56 | 1.56 | 1.46 |
| Linear Expansion Coefficient ($10^{-6}$/°C) At 40°C | 385 | 235 | 218 | 181 |
| Young'S Modulus ($10^7$pa) | 62.5 | 93.6 | 90.6 | 116 |
| Glass Transition Point (°C) | 38 | 58 | 54 | 67 |
| Shore D Hardness | 25 | 62 | 64 | 68 |

FIBER OPTIC ILLUMINATION MODULE WITH FIBER OPTIC COUPLING

This Nonprovisional application claims priority under 35 U.S.C. §119(a) on Patent Application No. 2010-078966 filed in Japan on Mar. 30, 2010, the entire contents of which are hereby incorporated by reference.

TECHNICAL FIELD

The present invention relates to a light-emitting module including an optical fiber.

BACKGROUND ART

A generally-used light-emitting module includes a housing in which a light-emitting device (LD: laser diode or LED: light-emitting diode) and an optical fiber are provided so that a light-emitting end surface of the light-emitting device and one end (hereinafter, referred to as a "light-receiving end") of the optical fiber face each other. Further, the other end (hereinafter, referred to as a "light-emitting end") of the optical fiber is drawn out from a neck portion of the housing and extends to the outside of the housing. A light-emitting module including an LD as the light-emitting device is called an LD module or the like, whereas a light-emitting module including an LED as the light-emitting device is called an LED module or the like.

In the conventional LD module or LED module, the optical fiber has a bare fiber section which is not covered with a covering (jacket), the bare fiber section extending from the light-receiving end to the neck portion. Due to this, light leakage occurs from the bare fiber section, which results in a local temperature increase inside the housing and/or in the vicinity of the neck portion. This makes it difficult to allow the LD or LED to operate at a predetermined temperature. As a conventional technique for addressing this problem, there has been a semiconductor laser module disclosed in Patent Literature 1.

The semiconductor laser module of Patent Literature 1 includes (i) a covering part covering cladding parts of a single mode fiber and (ii) an outer cladding part surrounding an inner cladding part, wherein each of the covering part and the outer cladding part is set to have a refractive index lower than that of the inner cladding part.

With this configuration, cladding-mode light guided through the cladding part of the single mode fiber is confined in the cladding part so as to be kept away from the housing. This prevents a local temperature increase inside the housing and/or in the vicinity of the neck portion.

CITATION LIST

[Patent Literature]

[Patent Literature 1]

Japanese Patent Application Publication, Tokukai, No. 2001-51166 A (Publication Date: Feb. 23, 2001)

SUMMARY OF INVENTION

Technical Problem

The inventors of the present invention examined if the semiconductor laser module of Patent Literature 1 has a configuration for adequately preventing a temperature increase inside the housing and/or in the vicinity of the neck portion. As a result, the inventors of the present invention found that the semiconductor laser module of Patent Literature 1 has the following problems:

The semiconductor laser module of Patent Literature 1 is configured such that, in the vicinity of the neck portion, an outer surface of the bare fiber section is fixed by an adhesive having a refractive index higher than that of the cladding part of the optical fiber. Due to this, the semiconductor laser module of Patent Literature 1 involves a problem of easily causing light leakage from the bare fiber section, thereby being likely to increase the temperature inside the housing and/or in the vicinity of the neck portion.

Here, it is clear that the adhesive described in Patent Literature 1 has a refractive index higher than that of the cladding part in the bare fiber section, since Patent Literature 1 describes that light emitted to the outside of the cladding part is absorbed into the adhesive.

Next, the inventors of the present invention searched for the reason why, as described above, Patent Literature 1 does not give consideration to light leakage from the bare fiber section, in spite of that Patent Literature 1 recognizes that most of light being to be released to the outside of the optical fiber has been already released at a position being away by 5 cm from the laser light-receiving end surface of the optical fiber.

First, Patent Literature 1 is based on the premise that the optical fiber is a single mode fiber. A coupling efficiency between a single mode fiber and an LD is at most approximately 70%. This is quite smaller than a coupling efficiency between a multi-mode fiber and an LD, which is approximately 90% though 95%.

Furthermore, as compared with the single mode fiber, the multi-mode fiber is more likely to cause light having not been coupled to a core part to be coupled to a cladding part. Therefore, for example, in a case involving use of a high-power LD with an output power of approximately 10 W, the multi-mode fiber may cause laser light of approximately 0.5 W through 1 W to be coupled to the cladding part. Accordingly, as compared with the single mode fiber, the multi-mode fiber is considered to cause a far greater amount of light leakage from the bare fiber section. On the other hand, Patent Literature 1 assumes use of (i) the LD whose output power is approximately 300 mW and (ii) the single mode fiber. With such a configuration, an amount of light leakage from the bare fiber section is considered to be relatively small.

Thus, in the case where the single mode fiber (use thereof is the premise of Patent Literature 1) is used together with the LD having an output power of approximately 300 mW (which is an assumed value in Patent Literature 1), the light leakage from the bare fiber section does not matter so much. This is considered to be the reason why Patent Literature 1 could not arrive at the problem of the light leakage from the bare fiber section.

In the future, an LD or an LED may be developed to have an even greater output power. In such a case, if there occurs a drastic change in a coupling efficiency between (i) the LD or the LED and (ii) an optical fiber due to some troubles and accordingly a great amount of light leakage occurs from the bare fiber section, burnout may occur in the vicinity of the neck portion of the housing, or the light leaked to the outside may adversely affect a surrounding area. Thus, also for the purpose of securing safety, it will become more and more important to deal with the problem of the large amount of light leakage from the bare fiber section.

Here, the output power of the LED is not expected to be increased so much in the future, as compared with that of the LD. However, the LED emits, from its light-emitting end surface, light which is likely to expand at a wider angle than that of the LD. On this account, in a case where the LED and the optical fiber are optically coupled to each other, light having not been coupled to the core part may be more likely to be coupled to the cladding part. Therefore, also in the case of using the LED, it may be necessary to give consideration to light leakage from the bare fiber section.

The present invention was made in view of the foregoing problems, and an object of the present invention is to provide a light-emitting module which is capable of reducing an amount of light leakage in the vicinity of a bare fiber section.

Solution to Problem

In order to solve the foregoing problems, a light-emitting module of the present invention includes: (i) a light-emitting device having a light-emitting end surface from which light is emitted; (ii) an optical fiber which is a multi-mode fiber, the optical fiber including: a core part extending along a light-guide direction in which light is guided; and a cladding part extending along the light-guide direction and covering the core part, the cladding part having a refractive index lower than that of the core part, the optical fiber having a covered fiber section and a bare fiber section, the covered fiber section including a covering part extending along the light-guide direction and covering the cladding part, the bare fiber section having a light-receiving end into which the light enters, the bare fiber section being not covered with the covering part; and (iii) a housing in which the light-emitting device is provided, the housing including a fixing part for fixing a portion of the bare fiber section such that the light-emitting end surface of the light-emitting device and the light-receiving end of the bare fiber section face each other, the fixing part fixing the portion of the bare fiber section by a resin material having a refractive index lower than that of the cladding part in the bare fiber section.

According to the above configuration, the fixing part fixes the portion of the bare fiber section by the resin material having a refractive index lower than that of the cladding part in the bare fiber section.

Thanks to this, in the vicinity of the fixing part, cladding-mode light having not been coupled to the core part of the optical fiber as a waveguide mode is confined in the cladding part and guided therethrough, without being emitted to the outside of the cladding part in the bare fiber section. This can reduce, in the vicinity of the fixing part, an amount of light leakage from the bare fiber section. Accordingly, it is possible to reduce an amount of light leakage in the vicinity of the bare fiber section.

In order to solve the foregoing problems, a light-emitting module of the present invention is a light-emitting module, including: (i) a light-emitting device having a light-emitting end surface from which light is emitted; (ii) an optical fiber including: a core part extending along a light-guide direction in which light is guided; and a cladding part extending along the light-guide direction and covering the core part, the cladding part having a refractive index lower than that of the core part, the optical fiber having a covered fiber section and a bare fiber section, the covered fiber section including a covering part extending along the light-guide direction and covering the cladding part, the bare fiber section having a light-receiving end into which the light enters, the bare fiber section being not covered with the covering part; and (iii) a housing in which the light-emitting device is provided, the light-emitting module being characterized in that: the optical fiber is a multi-mode fiber; the housing includes a fixing part for fixing a portion of the bare fiber section such that the light-emitting end surface of the light-emitting device and the light-receiving end of the bare fiber section face each other; and the fixing part fixes the portion of the bare fiber section by a resin material having a refractive index lower than that of the cladding part in the bare fiber section.

According to the above configuration, the fixing part fixes the portion of the bare fiber section by the resin material having a refractive index lower than that of the cladding part in the bare fiber section.

Thanks to this, in the vicinity of the fixing part, cladding-mode light having not been coupled to the core part of the optical fiber as a waveguide mode is confined in the cladding part and guided therethrough, without being emitted to the outside of the cladding part in the bare fiber section. This can reduce, in the vicinity of the fixing part, an amount of light leakage from the bare fiber section. Accordingly, it is possible to reduce an amount of light leakage in the vicinity of the bare fiber section.

Advantageous Effects of Invention

As described above, a light-emitting module of the present invention is configured such that the optical fiber is a multi-mode fiber; the housing includes a fixing part for fixing a portion of the bare fiber section such that the light-emitting end surface of the light-emitting device and the light-receiving end of the bare, fiber section face each other; and the fixing part fixes the portion of the bare fiber section by a resin material having a refractive index lower than that of the cladding part in the bare fiber section.

Therefore, the light-emitting module of the present invention provides an effect of reducing an amount of light leakage in the vicinity of the bare fiber section.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1

FIG. 2

FIG. 3

FIG. 4

FIG. 5(a)

FIG. 5(b)

DESCRIPTION OF EMBODIMENTS

The following will describe one embodiment of the present invention with reference to FIGS. 1 through 5(b).

[1. LD Module 10a]

Figure 1:
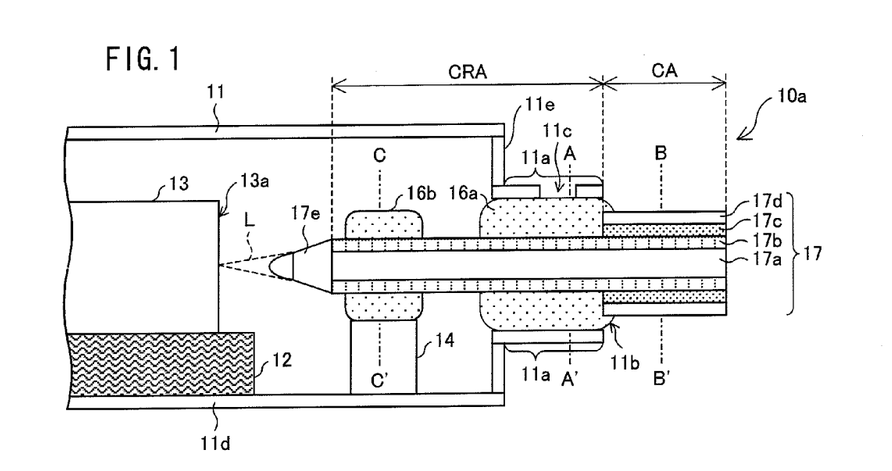
FIG. 1 is a cross-sectional view illustrating a configuration of a light-emitting module according to one embodiment of the present invention.

First, with reference to FIG. 1, the following will describe a configuration of an LD module (light-emitting module) 10a, which is one embodiment of a light-emitting module of the present invention. FIG. 1 is a cross-sectional view illustrating a configuration of the LD module 10a. In the present embodiment, described as one embodiment of the light-emitting module is a laser diode module including an LD (light-emitting device) 13. However, the present invention is not limited to this. Instead, the present invention is also applicable to an LED module including an LED, etc.

As shown in FIG. 1, the LD module 10a includes a housing 11, a fixed substrate 12, an LD 13, a mount (mount part, fixing part) 14, a resin (resin material, resin sealing part, fixing part) 16a, a resin (resin material, fixing part) 16b, and an optical fiber (multi-mode fiber) 17.

The housing 11 is an optical element package configured to accommodate the LD 13 and to fix the LD thereto. The housing 11 includes an optical fiber penetration pipe (fixing part) 11a serving as a neck portion, a base plate 11d, a side plate 11e, etc. On the base plate 11d of the housing 11, the fixed substrate 12 is provided. Further, onto the fixed substrate 12, the LD 13 is fixed. The base plate 11d is preferably made of a material having a high thermal conductivity, examples of which encompass copper. Note that the side plate 11e is made of, e.g., iron or an alloy containing iron such as KOVAR (Registered Trademark) or stainless steel.

The optical fiber penetration pipe 11a is provided to the side plate 11e of the housing 11, and includes a penetration hole 11b having a cylindrical shape and extending from the side plate 11e along a direction parallel to the base plate 11d. Further, the optical fiber penetration pipe 11a is open to the inside and the outside of the housing 11. Furthermore, the optical fiber penetration pipe 11a has a side surface whose top part is provided with a supply hole 11c, through which the resin 16a is filled. In the present embodiment, the optical fiber penetration pipe 11a is provided with the supply hole 11c. However, the present invention is not limited to the optical fiber penetration pipe 11a having such the configuration. Instead, an optical fiber penetration pipe 11a provided with no supply hole 11c may be used. Further, in the present embodiment, the supply hole 11c is provided on the top part of the side surface of the optical fiber penetration pipe 11a. However, the present invention is not limited to this. Instead, for example, the supply hole 11c may be provided on a bottom part of the side surface of the optical fiber penetration pipe 11a.

The optical fiber penetration pipe 11a is preferably made of, e.g., metal or an alloy such as KOVAR (Registered Trademark), an iron-nickel alloy, iron, or stainless steel.

The optical fiber 17 of the present embodiment is a multi-mode fiber which allows a plurality of waveguide modes to be guided through a core part 17a at a wavelength at which the LD 13 is used, and is a so-called lensed fiber including a lens part 17e (light-receiving end) whose light-receiving end, into which laser light (light) L emitted by the LD 13 enters, is lens-shaped. The lens part 17e has a lens function for allowing laser light L entered thereto to be converged into the core part 17a. The LD 13 and the optical fiber 17 are optically connected with each other via the lens part 17e.

The optical fiber 17 is inserted into the housing 11 via the optical fiber penetration pipe 11a, and is provided such that (i) the lens part 17e of the optical fiber 17 and (ii) a light-emitting end surface 13a of the LD 13 face each other, from which light-emitting end surface 13a the laser light L is emitted. Further, the optical fiber 17 is optically aligned and connected with the LD 13.

Roughly, the optical fiber 17 is constituted by two sections. One of the two sections is a covered fiber section CA, which is on the outside of the housing 11 and extends along a light-guide direction in which laser light L having entered the lens part 17e is guided. The covered fiber section CA includes (i) the core part 17a extending along the light-guide direction, (ii) a first cladding part 17b covering the core part 17a and extending along the light-guide direction, (iii) a second cladding part (covering part, primary covering layer) 17c covering the first cladding part 17b and extending along the light-guide direction, and (iv) a covering part (secondary covering layer) 17d covering the second cladding part 17c and extending along the light-guide direction.

The other of the two sections constituting the optical fiber 17 is a bare fiber section CRA extending along the light-guide direction from the right-hand end (when seen in FIG. 1) of the lens part 17e, which is provided inside the housing 11, to an opening of the optical fiber penetration pipe 11a which opening is located at the right-hand end (when seen in FIG. 1) of the optical fiber penetration pipe 11a. The bare fiber section CRA is a non-covered section which includes merely the core part 17a and the first cladding part 17b and is not covered with the covering (covering part).

The bare fiber section CRA of the optical fiber 17 is penetrated through the penetration hole 11b of the optical fiber penetration pipe 11a. In this state, an area surrounding the bare fiber section CRA is sealed with the resin 16a so that the bare fiber section CRA is fixed.

Consequently, the neck portion of the housing 11 can be made smaller, as compared with that of the semiconductor laser module of Patent Literature 1, according to which the fixation is carried out through use of a ferrule.

Further, the housing 11 includes the mount 14, which is provided on the base plate 11 d and below the bare fiber section CRA penetrated through the penetration hole 11b of the optical fiber penetration pipe 11a.

Furthermore, above the mount 14, a portion of the bare fiber section CRA of the optical fiber 17 is fixed by the resin 16b which covers a portion of the bare fiber section CRA.

Figure 2:
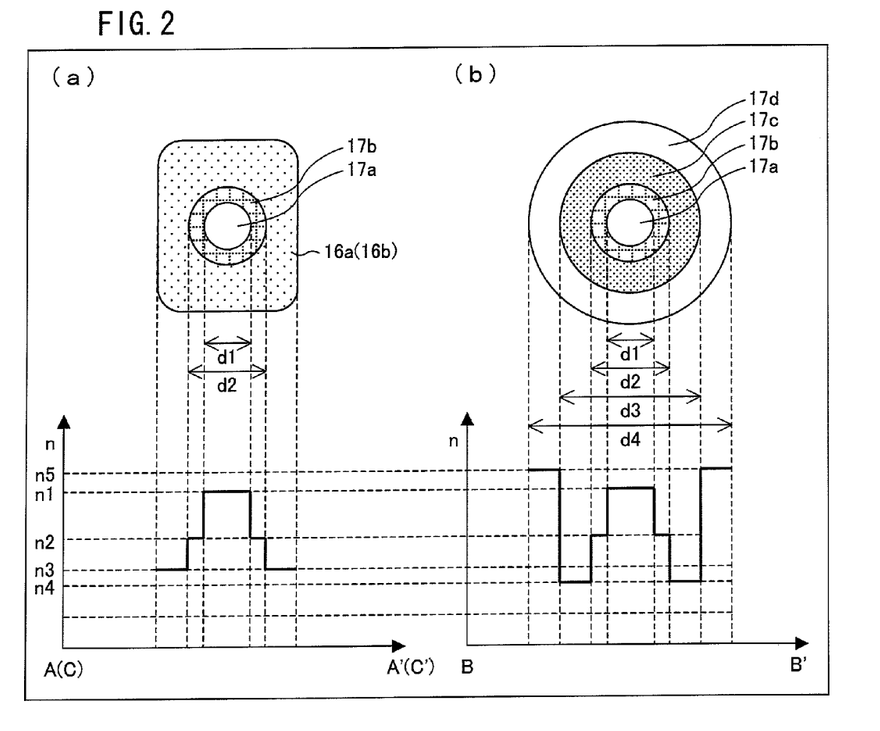
FIG. 2, related to the light-emitting module, is an explanatory diagram comparing (i) a refractive index distribution in a fixing part and (ii) a refractive index distribution in a covered fiber section. (a) of FIG. 2 shows: a configuration seen in an A-A' cross section (or a C-C' cross section) shown in FIG. 1 or FIG. 3 (upper part in (a) of FIG. 2); and a refractive index distribution therein (lower part in (a) of FIG. 2). Meanwhile, (b) of FIG. 2 shows: a configuration seen in a B-B' cross section shown in FIG. 1 or FIG. 3 (upper part in (b) of FIG. 2); and a refractive index distribution therein (lower part in (b) of FIG. 2).

Next, the following will describe, with reference to (a) and (b) of FIG. 2, (i) a cross-sectional configuration of the optical fiber 17, the resin 16a, and the resin 16b and (ii) a refractive index distribution in the cross section.

(a) of FIG. 2 shows: a configuration seen in an A-A' cross section (or a C-C' cross section) shown in FIG. 1 (upper part in (a) of FIG. 2); and a refractive index distribution therein (lower part in (a) of FIG. 2). Meanwhile, (b) of FIG. 2 shows: a configuration seen in a B-B' cross section shown in FIG. 1 (upper part in (b) of FIG. 2); and a refractive index distribution (lower part in (b) of FIG. 2).

The vertical axis for the refractive index distribution shown in each of (a) and (b) of FIG. 2 indicates a level of a refractive index n. The refractive indices n1 through n5 represent respective refractive indices of the core part 17a, the first cladding part 17b, the resin 16a (or the resin 16b), the second cladding part 17c, and the covering part 17d, each of which is included in the optical fiber 17, and schematically show a magnitude relationship between the refractive indices.

In each of (a) and (b) of FIG. 2, the core part 17a has a core diameter d1 of 105 μm, the first cladding part 17b has a first cladding diameter d2 of 125 μm, and the covering part 17d has a covering part outer diameter d4 of 250 μm. Note that the second cladding part 17c has a second cladding diameter d3 of any value.

In the present embodiment, the core part 17a has a refractive index n1 of 1.465, the first cladding part 17b has a refractive index n2 of 1.450, the resin 16a and the resin 16b each have a refractive index n3 of 1.40, and the second cladding part 17c has a refractive index n4 of 1.38. The covering part 17d is made of a UV (Ultra Violet)-curing resin. In the present embodiment, the covering part 17d has a refractive index n5 being in a range of 1.5 to 1.6. However, the refractive index n5 may have any value (namely, even in a case where a relationship "the refractive index n5>the refractive index n4" is established, an effect given by this on light confinement by the first cladding part 17b is adequately small). Further, in a case where quartz (silicon dioxide: $SiO_2$) is used as a base material, the refractive indices n1 and n2 (in some cases, n4) are determined by the type and the amount of dopant added to quartz. Note that the refractive indices n1 through n5 are not limited to the values indicated above, and only need to satisfy the conditions described below.

As shown in (a) of FIG. 2, a relationship "the refractive index n1>the refractive index n2>the refractive index n3" is established in the refractive index distribution observed in the A-A' cross section of the bare fiber section CRA of the optical fiber 17, the A-A' cross section being in the vicinity of the optical fiber penetration pipe 11a. Namely, the refractive index n3 of the resin 16a is lower than the refractive index n2 of the first cladding part 17b.

Consequently, it is possible to (i) reduce, in the vicinity of the optical fiber penetration pipe 11a, an amount of light leakage from the bare fiber section CRA, and to (ii) seal with the resin 16b an area surrounding a portion of the bare fiber section CRA so that the portion of the bare fiber section CRA is fixed, on the inside of the penetration hole 11b of the optical fiber penetration pipe 11a.

Similarly, a relationship "the refractive index n1>the refractive index n2>the refractive index n3" is established in the refractive index distribution observed in the C-C' cross section of the bare fiber section CRA of the optical fiber 17, the C-C' cross section being in the vicinity of an area above the mount 14. Namely, the refractive index n3 of the resin 16b is lower than the refractive index n2 of the first cladding part 17b. In the present embodiment, the resin 16a and the resin 16b are made of the same resin material. Therefore, the refractive indices of the resin 16a and the resin 16b are also the same. Alternatively, however, the resin 16a and the resin 16b may be made of different resin materials, and the refractive indices of the resin 16a and the resin 16b may not be the same.

Consequently, it is possible to (i) fix, in the area above the mount 14 being provided on the base plate 11d of the housing 11, a portion of the bare fiber section CRA by the resin material, and to (ii) reduce, in the vicinity of the area above the mount 14, an amount of light leakage from the bare fiber section CRA. Furthermore, since this can reduce a degree of a temperature increase inside the housing 11, it is also possible to elongate life of the LD 13.

As shown in (b) of FIG. 2, a relationship "the refractive index n5>the refractive index n1>the refractive index n2>refractive index n4" is established in the refractive index distribution observed in the B-B' cross section of the covered fiber section CA of the optical fiber 17. Namely, the refractive index n4 of the second cladding part 17c is lower than the refractive index n2 of the first cladding part 17b.

Thus, the refractive index n4 of the second cladding part 17c, which is provided around the first cladding part 17b, is lower than the refractive index n2 of the first cladding part 17b. Therefore, cladding-mode light having not been coupled to the core part 17a of the optical fiber 17 as a waveguide mode is confined in the first cladding part 17b and is guided therethrough, without being emitted to the outside of the first cladding part 17b. Consequently, it is possible to keep the cladding-mode light away from the housing 11 and bring the cladding-mode light to the other end (e.g., a fused point) of the optical fiber 17. This makes it possible to reduce a degree of a temperature increase inside the housing 11 and/or in the vicinity of the optical fiber penetration pipe 11a. Furthermore, since this can reduce a degree of a temperature increase inside the housing 11, it is also possible to elongate life of the LD 13. In the present embodiment, the relationship "the refractive index n3>the refractive index n4" is established. Typically, a resin material having a higher refractive index tends to be harder. Accordingly, in the case where the relationship "the refractive index n3>the refractive index n4" is established, the resin 16a is considered to be harder than the second cladding part 17c. Therefore, use of such the resin can increase the strength of the penetration hole 11b of the optical fiber penetration pipe 11a. Further, in the case where the relationship "the refractive index n3>the refractive index n4" is established, if the resin 16a is made of a resin material having a refractive index higher than that of the second cladding part 17c in the covered fiber section CA of the optical fiber 17, it is possible to allow a component being to be leaked from a fiber pigtail portion to be leaked in advance in the vicinity of the optical fiber penetration pipe 11a. However, a magnitude relationship between the refractive index n3 of the resin 16a (16b) and the refractive index n4 of the second cladding part 17c may be arbitrarily set, and the relationship may be "the refractive index n3≤the refractive index n4". In the present embodiment, the relationship "the refractive index n4<the refractive index n5" is established. However, the refractive index n5 of the covering part 17d may be any value, and the relationship may be "the refractive index n4≥the refractive index n5".

The LD 13 is an LD chip, and is connected, via a wire, with a lead (not illustrated) externally inserted into the housing 11.

As described above, the LD module 10a of the present embodiment is configured such that, on the inside of the penetration hole 11b of the optical fiber penetration pipe 11a and/or above the mount 14, a portion of the bare fiber section CRA is fixed by the resin 16a and/or the resin 16b, each of which has a refractive index lower than that of the first cladding part 17b.

With this configuration, in the vicinity of the optical fiber penetration pipe 11a and/or the area above the mount 14, cladding-mode light having not been coupled to the core part 17a of the optical fiber 17 as a waveguide mode is confined in the first cladding part 17b and is guided therethrough, without being emitted to the outside of the first cladding part 17b in the bare fiber section CRA. Consequently, in the vicinity of the optical fiber penetration pipe 11a and/or the area above the mount 14, it is possible to reduce an amount of light leakage from the bare fiber section CRA. Thus, it is possible to reduce an amount of light leakage in the vicinity of the bare fiber section CRA.

Note that each of the above-described members is not limited to the above shape, the above structure, the above size, etc., and can be selected as needed depending on the use and/or the purpose of the LD module 10a.

[2. LD Module 10b]

Figure 3:
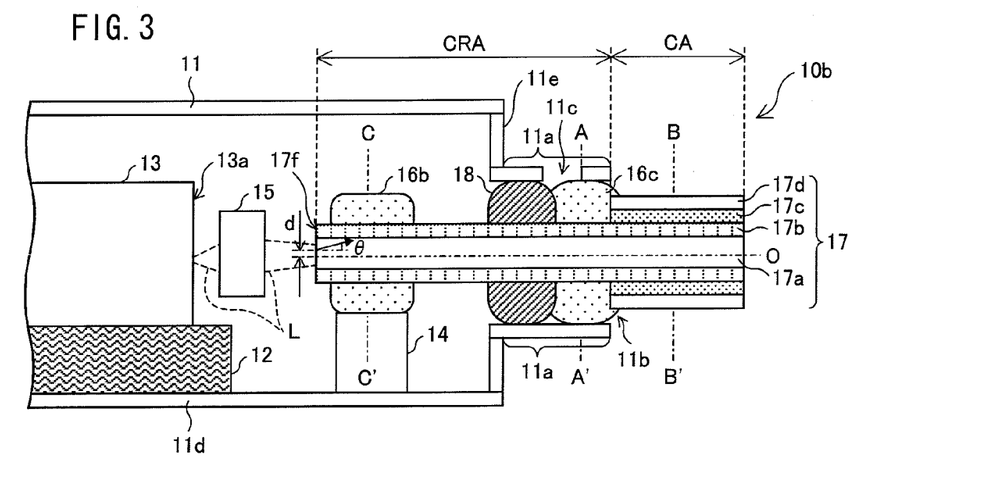
FIG. 3 is a cross-sectional view illustrating a configuration of a light-emitting module according to another embodiment of the present invention.

Next, with reference to FIG. 3, the following will describe a configuration of an LD module (light-emitting module) 10b, which is another embodiment of the light-emitting module of the present invention. FIG. 3 is a cross-sectional view illustrating a configuration of the LD module 10b.

Note that the LD module 10b is identical to the above-described LD module 10a, except for the features described below.

In the LD module 10b of the present embodiment, an optical fiber 17 is provided with a generally-used light-receiving end surface (light-receiving end) 17f, which serves as a light-receiving end into which laser light L enters. Further, in the LD module 10b of the present embodiment, the optical fiber 17 and an LD 13 are optically coupled to each other via a coupling optical system 15. In terms of this, the LD module 10b is different from the LD module 10a. Note that the coupling optical system may be made of a single or a plurality of optical element(s) such as a lens and/or a mirror as needed.

Furthermore, the LD module 10b of the present embodiment is configured such that, on the inside of a penetration hole 11b of an optical fiber penetration pipe 11a, an area surrounding a portion of a bare fiber section CRA is sealed with a resin (resin material, resin sealing part, fixing part) 16c and solder (solder-sealing part) 18, so that the portion of the bare fiber section CRA is fixed. In terms of this, the LD module 10b is different from the LD module 10a. Since the resin 16c is similar to the above-described resin 16a, explanations of the resin 16c are omitted here.

Typically, a resin material having a low refractive index is softer than solder. On the other hand, the solder, which is a metal, has a higher thermal conductivity than that of the resin material.

Therefore, by (i) providing the resin 16c and the solder 18 inside the penetration hole 11b of the optical fiber penetration pipe 11a and (ii) setting respective sizes of the resin 16c and the solder 18 appropriately, the LD module 10b can increase sealing strength inside the penetration hole 11b, confine cladding-mode light in an appropriate position, and allow leaked light to be absorbed by the solder 18 in an appropriate position for heat dissipation.

As described previously, the LD module 10b of the present embodiment is configured such that, on the inside of the penetration hole 11b of the optical fiber penetration pipe 11a and/or above a mount 14, a portion of the bare fiber section CRA is fixed by the resin 16c and/or a resin 16b, each of which has a refractive index lower than that of the first cladding part 17b.

With this configuration, in the vicinity of the optical fiber penetration pipe 11a and/or an area above the mount 14, cladding-mode light having not been coupled to a core part 17a of the optical fiber 17 as a waveguide mode is confined in a first cladding part 17b and is guided therethrough, without being emitted to the outside of the first cladding part 17b in the bare fiber section CRA. Consequently, in the vicinity of the optical fiber penetration pipe 11a and/or the area above the mount 14, it is possible to reduce an amount of light leakage from the bare fiber section CRA. Thus, it is possible to reduce an amount of light leakage in the vicinity of the bare fiber section CRA.

Note that each of the above-described members is not limited to the above shape, the above structure, the above size, etc., and can be selected as needed depending on the use and/or the purpose of the LD module 10b.

[3. Optical Power Distribution of Laser Light L Entered into Optical Fiber 17]

Figure 4:
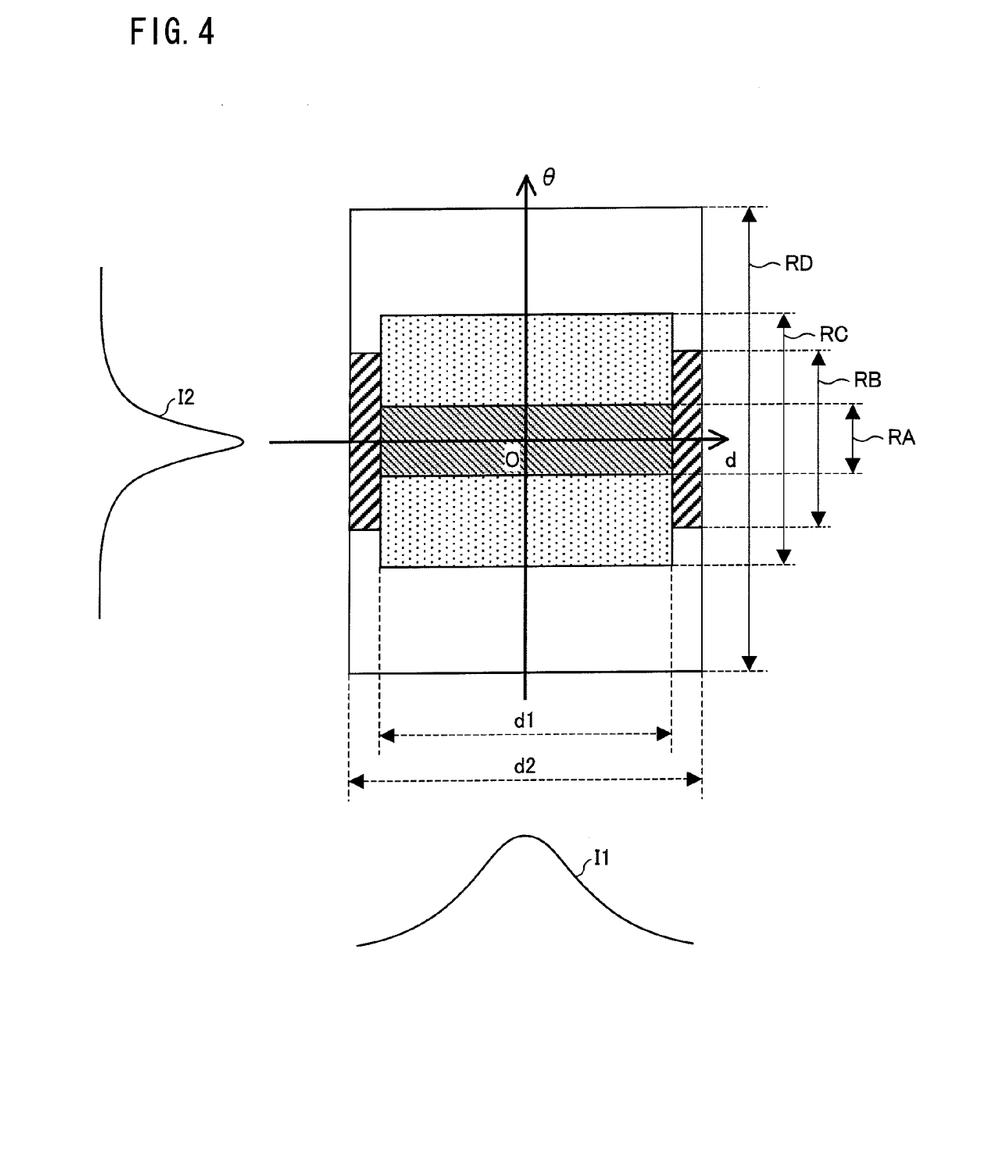
FIG. 4, related to the light-emitting module, is an explanatory diagram illustrating a relationship, observed when laser light (light beam) enters a light-receiving surface of an optical fiber, between (i) a distance between a core center and a position of the light-receiving end surface at which the laser light beam enters, (ii) an angle made by a center axis of a core part and the light beam, and (iii) an optical power distribution of the laser light which is observed after the laser light enters the light-receiving end surface.

Next, with reference to FIG. 4, the following will describe an optical power distribution observed when laser light L is entered into the optical fiber 17.

The horizontal axis shown in FIG. 4 indicates a distance d. The distance d, observed on the light-receiving end surface 17f of the optical fiber 17 in the LD module 10b (shown in FIG. 3) when laser light L (light beam) enters the light-receiving end surface 17f, extends from (i) a position of the light-receiving end surface 17f at which position the light beam enters to (ii) a core center (center axis O) of the core part 17a. Meanwhile, the vertical axis shown in FIG. 4 indicates an angle θ, which is made by the center axis O and the light beam.

Each of an optical power distribution curve I1 and an optical power distribution curve I2 is a schematic view conceptually illustrating an optical power distribution of the laser light L, where an optical power value on the viewer's side seen from this drawing is positive.

Note that an upper limit of an angle of a light beam propagating through the core part 17a with respect to an optical axis (herein, a half value of the angle, which half value is observed in a half area of the distribution with respect to the horizontal axis, is approximately 8 degrees) is determined by a total reflection condition which is defined by a difference between the refractive index of the core part 17a and that of the first cladding part 17b. Therefore, an optical power existing region RA is a region including optical power of laser light L satisfying (i) a condition that the angle θ of the light beam is smaller than the upper limit angle and (ii) a condition that the distance d is smaller than half of the core diameter d1. Note that the upper limit angle is equal to a complementary angle of a critical angle (90 degrees—critical angle); therefore, the upper limit angle should be called a maximum angle allowing propagation or a maximum propagation angle. However, in order to avoid complexity, the upper limit angle will be hereinafter simply referred to as a "maximum angle".

An optical power existing region RB is a region including optical power of light beam L satisfying (i) a condition that the angle θ is smaller than a maximum angle (a half value of the angle, which half value is observed in a half area of the distribution with respect to the horizontal axis, is approximately 15 degrees), which is defined by a difference between the refractive index of the first cladding part 17b and that of the resin 16a (the resin 16b or the resin 16c), and (ii) a condition that the distance d is smaller than half of the first cladding diameter d2.

An optical power existing region RC is a region including optical power of light beam L satisfying (i) a condition that the angle θ is smaller than an apparent maximum angle (a half value of the angle, which half value is observed in a half area of the distribution with respect to the horizontal axis, is approximately 17 degrees), which is defined by a difference between the refractive index of the core part 17a and that of the resin 16a (the resin 16b or the resin 16c) and is converted into a value in the core part 17a, and (ii) a condition that the distance d is smaller than half of the core diameter d1. Note that, since the laser light L enters the resin 16a (the resin 16b or the resin 16c) after being refracted at a boundary face between the core part 17a and the first cladding part 17b, the apparent maximum angle converted into the value in the core part 17a is large.

An optical power existing region RD is a region including optical power of light beam L satisfying (i) a condition that the angle θ is smaller than a maximum angle (a half value of the angle, which half value is observed in a half area of the distribution with respect to the horizontal axis, is approximately 47 degrees) allowing confinement of light in an air cladding and (ii) a condition that the distance d is smaller than half of the first cladding diameter d2. Note that there is no significant difference between (i) a maximum angle for optical power in the core part 17a and (ii) a maximum angle for optical power in the first cladding part 17b.

The optical power existing region RA includes optical power of light (core-mode light) propagating as a waveguide mode satisfying the total reflection condition due to the difference between the refractive index of the core part 17a and that of the first cladding part 17b. Thus, the optical power existing region RA includes approximately 95% through 99% of total optical power of the laser light L. Therefore, if the refractive index n3 of each of the resins 16a through 16c is higher than the refractive index n2 of the first cladding part 17b, optical components corresponding to approximately 1% through 5% of the total optical power are considered to form light which is leaked from the first cladding part 17b. This causes heat generation, etc.

The optical power existing region RB and the optical power existing region RC include optical power of light (cladding-mode light) propagating as a waveguide mode satisfying the total reflection condition due to (i) the difference between the refractive index of the first cladding part 17b and that of the second cladding part 17c or (ii) the difference between the refractive index of the first cladding part 17b and those of the resins 16a through 16c. Thus, each of the optical power existing region RB and the optical power existing region RC can include optical power corresponding to approximately 1% through 5% of total optical power of the laser light L. Therefore, according to each of the above-described LD module 10a and LD module 10b, the optical power corresponding to approximately 1% through 5% of the total optical power of the laser light L form light which is leaked from the first cladding part 17b. Consequently, it is possible to avoid heat generation, etc.

The optical power existing region RD is a region including optical power that can be confined by air (in a case where an external area of the bare fiber section CRA is air) but cannot be confined by a commercially-available low refractive index resin. Provided that an appropriate optical system is used, the optical power existing region RD is considered to include optical power which is far fewer than approximately 1% of total optical power of the laser light L.

In view of the above, even in a case where the coupling efficiency to the core part 17a is 99%, if the output power of the laser light L is 100 W, light leakage of as much as 1 W occurs from the bare fiber section CRA. Thus, it would be understood that heat generation is an unignorable matter.

[4. Optical Characteristics of Optical Fiber 17]

Figure 5A:
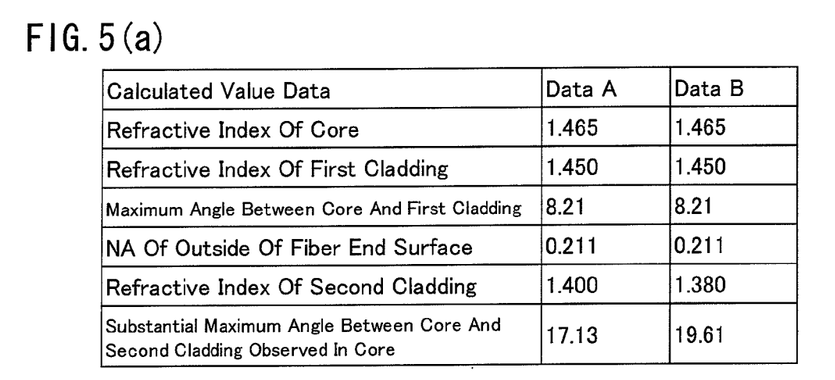
FIG. 5(a), related to the light-emitting module, is a table showing calculated values regarding optical characteristics of the optical fiber.

Next, with reference to FIG. 5(a), the following will describe a result of calculation of optical characteristics of the optical fiber 17.

Data A indicates calculated value data regarding the optical characteristics of the optical fiber 17, where, in the optical fiber 17, the refractive index n1 of the core part 17a (core) was set to 1.465, the refractive index n2 of the first cladding part 17b (first cladding) was set to 1.450, and the refractive index n3 of each of the resins 16a through 16c (second cladding) was set to 1.400.

On the other hand, Data B indicates calculated value data regarding the optical characteristics of the optical fiber 17, where the refractive index n1 was set to 1.465, the refractive index n2 was set to 1.450, and the refractive index n4 of the second cladding part 17c (second cladding) was set to 1.380.

First, for a numerical aperture NA of an outside of the light-receiving end surface 17f of the optical fiber 17, each of Data A and Data B indicates 0.211. For a maximum angle between the core part 17a and the first cladding part 17b, each of Data A and Data B indicates 8.21.

Further, for a substantial maximum angle between the core part 17a and the second cladding part 17c (or the resin 16a to the resin 16c) observed in the core part 17a, Data A indicates 17.13 and Data B indicates 19.61. The "substantial maximum angle" refers to an angle of a component which is at a limit of being able to be confined in the second cladding part 17c (or the resin 16a to the resin 16c), the angle being observed in the core part 17a. The substantial maximum angle does not depend on the refractive index n2 of the first cladding part 17b.

The results indicated by Data A and Data B show the following fact: As compared with a case where the covering part (second cladding) covering the bare fiber section CRA of the optical fiber 17 is made of a resin material whose refractive index is higher than that of the core part 17a, the optical fiber 17 of the present embodiment can confine even a component having a quite greater angle θ.

[5. Mechanical Properties of Resin Material]

Figure 5B:
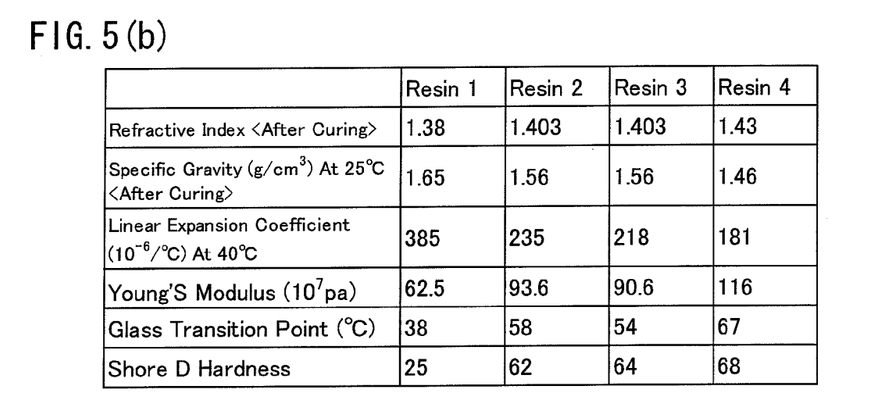
FIG. 5(b), related to the light-emitting module, is a table showing a result of comparison between mechanical properties of four types of resin materials.

Next, with reference to FIG. 5(b), the following will describe a result of comparison between mechanical properties of four types of resin materials.

Resin 1 is a resin which is used as a resin material of the second cladding part 17c. On the other hand, each of Resins 2 through 4 is a resin which is used as a resin material of a corresponding one of the resins 16a through 16c.

As shown in FIG. 5(b), Resin 1 had a refractive index of 1.38. This value satisfied a condition of being smaller than 1.450, which was the refractive index n2 of the first cladding part 17b. Further, Resin 1 had Young's modulus of $62.5 \times 10^7$ Pa, which was smaller than those of the other resins. Furthermore, Resin 1 had Shore D hardness of 25, which was extremely small. The reason for this is that Resin 1 is preferably a soft resin material, since Resin 1 is a constituent material of the covered fiber section CA of the optical fiber 17, i.e., the fiber pigtail portion of the LD module 10a or the LD module 10b.

Resins 2, 3, and 4 had refractive indices of 1.403, 1.403, and 1.43, respectively. These values satisfied a condition of being smaller than 1.450, which was the refractive index n2 of the first cladding part 17b. Further, Resins 2, 3, and 4 had Young's moduli of $93.6 \times 10^7$ Pa, $90.6 \times 10^7$ Pa, and $116 \times 10^7$ Pa, respectively, which were greater than that of Resin 1. Furthermore, Resins 2, 3, and 4 had Shore D hardness of 62, 64, and 68, respectively, which were extremely greater than that of Resin 1. The reason for this is that each of Resins 2, 3, and 4 is preferably a hard resin material, since each of Resins 2, 3, and 4 is a constituent material for fixing a portion of the bare fiber section CRA of the optical fiber 17.

Furthermore, at 40° C., Resin 1 had a linear expansion coefficient of $385 \times 10^{-6}/°$ C., which was greater than those of the other resins. On the other hand, Resins 2, 3, and 4 had linear expansion coefficients of $235 \times 10^{-6}/°$ C., $218 \times 10^{-6}/°$ C., and $181 \times 10^{-6}/°$ C., respectively, which were smaller than that of Resin 1.

Here, a constituent material for fixing a portion of the bare fiber section CRA of the optical fiber 17 preferably has a small linear expansion coefficient. As is clear from the above result, also in view of the linear expansion coefficient, Resins 2 through 4 are more suitable as a resin material than Resin 1.

[6. Method of Manufacturing LD Module]

Next, with reference to FIGS. 1 and 3, the following will describe one example of a method of manufacturing the above-described LD module 10a or 10b.

First, the mount 14 is fixed onto the base plate 11d by solder, etc. Then, the fixed substrate 12 and the LD 13 are fixed by solder, etc. Alternatively, the LD 13 may have been fixed onto the fixed substrate 12 in advance by solder, etc. Further alternatively, the LD 13 and the fixed substrate 12 may have been connected with each other in advance via wire bonding, etc.

Next, the fixed substrate 12 is electrically wired to a lead pin (not illustrated) penetrating through the housing 11 from the inside to the outside of the housing 11. The wiring is preferably carried out by means of wire bonding.

Further, the bare fiber section CRA of the optical fiber 17 is penetrated through the penetration hole 11b of the optical fiber penetration pipe 11a. Subsequently, the bare fiber section CRA of the optical fiber 17 is aligned with the LD 13 directly (e.g., in a case of the LD module 10a) or via the coupling optical system 15 (e.g., in a case of the LD module 10b), and is then fixed.

Furthermore, the penetration hole 11b of the optical fiber penetration pipe 11a is filled with the resin 16a (e.g., in a case of the LD module 10a) or the solder 18 instead of the resin 16a, for the purpose of sealing and reinforcement. Moreover, after the penetration hole 11b is sealed with the solder 18, the penetration hole 11b may be further filled with the resin 16c for reinforcement (e.g., in a case of the LD module 10b).

In a case where a UV-curing resin is used as a material of the resin 16a or the resin 16c, the resin 16a or the resin 16c before curing may be filled to the penetration hole 11b and thereafter be subjected to UV irradiation. In a case where the solder 18 is filled to the penetration hole 11b, it is preferable to heat the optical fiber penetration pipe 11a by high-frequency induction heating so that the solder 18 is molten. Alternatively, the optical fiber penetration pipe 11a may be heated by a heater so that the solder 18 is molten. It is preferable to further reinforce the outside of the optical fiber penetration pipe 11a with a rubber boot, if necessary.

Note that the present invention can also be expressed as follows:

The light-emitting module of the present invention may be configured such that: the refractive index of the resin material is higher than that of the covering part in the covered fiber section of the optical fiber.

Typically, a resin material having a higher refractive index tends to be harder. In view of this, the above configuration, which uses a relatively hard resin material, can enhance the strength of the fixing part.

Further, the light-emitting module of the present invention may be configured such that: the fixing part includes an optical fiber penetration pipe having a penetration hole through which the light-receiving end of the bare fiber section is penetrated and the penetration hole of the optical fiber penetration pipe includes, inside thereof, a resin sealing part for sealing with the resin material an area surrounding the portion of the bare fiber section in a state where the bare fiber section is penetrated through the penetration hole.

According to the above configuration, it is possible to (i) reduce, in the vicinity of the optical fiber penetration pipe, an amount of light leakage from the bare fiber section, and to (ii) seal with the resin material an area surrounding a portion of the bare fiber section so that the portion of the bare fiber section is fixed, on the inside of the penetration hole of the optical fiber penetration pipe.

Further, the above configuration is such that, on the inside of the penetration hole of the optical fiber penetration pipe, the area surrounding the portion of the bare fiber section is sealed with the resin material. Therefore, the neck portion of the housing can be made smaller, as compared with that of the semiconductor laser module of Patent Literature 1, according to which the fixing is carried out through use of a ferrule.

Further, the light-emitting module of the present invention may be configured such that: the penetration hole of the optical fiber penetration pipe includes, inside thereof, a solder sealing part for sealing with solder an area surrounding a portion of the bare fiber section in a state where the bare fiber section is penetrated through the penetration hole.

Typically, a resin material having a low refractive index is softer than solder. On the other hand, the solder, which is a metal, has a higher thermal conductivity than that of the resin material.

Therefore, by (i) providing the resin sealing part and the solder sealing part inside the penetration hole of the optical fiber penetration pipe and (ii) setting respective sizes of the resin sealing part and the solder sealing part appropriately, the above configuration can increase sealing strength inside the penetration hole, confine cladding-mode light in an appropriate position, and allow leaked light to be absorbed by the solder in an appropriate position for heat dissipation.

Further, the light-emitting module of the present invention may be configured such that: the fixing part includes a mount part which is provided on a base plate of the housing and below the bare fiber section penetrated through the penetration hole of the optical fiber penetration pipe; and a portion of the bare fiber section which portion is above the mount part is fixed by a resin material (i) covering the portion of the bare fiber section and (ii) having a refractive index lower than that of the cladding part in the bare fiber section.

According to the above configuration, it is possible to (i) fix, in an area above the mount part being provided on the base plate of the housing, the portion of the bare fiber section by the resin material, and to (ii) reduce, in the vicinity of the area above the mount part, an amount of light leakage from the bare fiber section. Furthermore, since this can reduce a degree of a temperature increase inside the housing, it is also possible to elongate life of the light-emitting device.

Further, the light-emitting module of the present invention may be configured such that: the covered fiber section of the optical fiber includes (i) a primary covering layer extending along the light-guide direction and covering the cladding part and (ii) a secondary covering layer extending along the light-guide direction and covering the primary covering layer; and the primary covering layer has a refractive index lower than that of the cladding part in the bare fiber section.

According to the above configuration, the covering part includes the primary covering layer and the secondary covering layer. Further, the primary covering layer, which is closer to the cladding part, has a refractive index lower than that of the cladding part. Therefore, cladding-mode light having not been coupled to the core part of the optical fiber as a waveguide mode is confined in the cladding part and guided therethrough, without being emitted to the outside of the cladding part. Consequently, it is possible to keep the cladding-mode light away from the housing and bring the cladding-mode light to the other end of the optical fiber. This makes it possible to further reduce a degree of a temperature increase inside the housing and/or in the vicinity of the optical fiber penetration pipe. Furthermore, since this can further reduce the degree of the temperature increase inside the housing, it is possible to further elongate life of the light-emitting device.

[Additional Statements]

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention can be used as, e.g., a light-emitting module for use in optical communications system.

Reference Signs List 10a, 10b LD module (light-emitting module)
11 Housing
11a Optical fiber penetration pipe (fixing part)
11b Penetration hole
11c Supply hole
11d Base plate
11e Side plate
12 Fixed substrate
13 LD (light-emitting device)
13a Light-emitting end surface
14 Mount (mount part, fixing part)
15 Coupling optical system
16a Resin (resin material, resin sealing part, fixing part)
16b Resin (resin material, fixing part)
16c Resin (resin material, resin sealing part, fixing part)
17 Optical fiber (multi-mode fiber)
17a Core part
17b First cladding part (cladding part)
17c Second cladding part (covering part, primary covering layer)
17d Covering part (secondary covering layer)
17e Lens part (light-receiving end)
17f Light-receiving end surface (light-receiving end)
18 Solder (solder sealing part)
CA Covered fiber section
CRA Bare fiber section
θ Angle
d Distance
d1 Core diameter
d2 First cladding diameter
d3 Second cladding diameter
d4 Covering part outer diameter
I1, I2 Optical power distribution curve
L Laser light (light)
n, n1 through n5 Refractive index
O Center axis
RA, RB, RC, RD Optical power existing region

The invention claimed is:

1. A light-emitting module, comprising:
(i) a light-emitting device having a light-emitting end surface from which light is emitted;
(ii) an optical fiber which is a multi-mode fiber, the optical fiber including:
a core part extending along a light-guide direction in which light is guided; and
a cladding part extending along the light-guide direction and covering the core part, the cladding part having a refractive index lower than that of the core part,
the optical fiber having a covered fiber section and a bare fiber section,
the covered fiber section including a covering part extending along the light-guide direction and covering the cladding part,
the bare fiber section having a light-receiving end into which the light enters, the bare fiber section being not covered with the covering part; and
(iii) a housing in which the light-emitting device is provided, the housing including a fixing part for fixing a portion of the bare fiber section such that the light-emitting end surface of the light-emitting device and the light-receiving end of the bare fiber section face each other, the fixing part fixing the portion of the bare fiber section by a resin material having a refractive index lower than that of the cladding part in the bare fiber section, wherein:
the fixing part includes an optical fiber penetration pipe having a penetration hole through which the light-receiving end of the bare fiber section is penetrated; and
the penetration hole of the optical fiber penetration pipe includes, inside thereof, a resin sealing part for sealing with the resin material an area surrounding the portion of the bare fiber section in a state where the bare fiber section is penetrated through the penetration hole.

2. The light-emitting module as set forth in claim 1, wherein:
the penetration hole of the optical fiber penetration pipe includes, inside thereof, a solder sealing part for sealing with solder an area surrounding a portion of the bare fiber section in a state where the bare fiber section is penetrated through the penetration hole.

3. The light-emitting module as set forth in claim 1, wherein:
the fixing part includes a mount part which is provided on a base plate of the housing and below the bare fiber section penetrated through the penetration hole of the optical fiber penetration pipe; and
a portion of the bare fiber section which portion is above the mount part is fixed by a resin material (i) covering the portion of the bare fiber section and (ii) having a refractive index lower than that of the cladding part in the bare fiber section.

4. The light-emitting module as set forth in claim 1, wherein:
the covered fiber section of the optical fiber includes (i) a primary covering layer extending along the light-guide direction and covering the cladding part and (ii) a secondary covering layer extending along the light-guide direction and covering the primary covering layer; and
the primary covering layer has a refractive index lower than that of the cladding part in the bare fiber section.

* * * * *